United States Patent [19]

Fochesato

[11] 4,298,509

[45] Nov. 3, 1981

[54] NONINFLAMMABLE OLEFIN FIBERS AND METHOD OF PRODUCING SAME

[76] Inventor: Antonio Fochesato, Via Romana Rompato 19, Schio (Vicenza), Italy

[21] Appl. No.: 74,903

[22] Filed: Sep. 12, 1979

Related U.S. Application Data

[63] Continuation-in-part of Ser. No. 864,459, Dec. 27, 1977, Pat. No. 4,193,911.

[30] Foreign Application Priority Data

Oct. 5, 1977 [IT]  Italy ............................... 85639 A/77

[51] Int. Cl.$^3$ ........................... C08K 3/22; C08K 3/32; C08K 5/02; C08K 5/06
[52] U.S. Cl. ......................... 260/29.1 SB; 260/45.7 P; 260/45.7 R; 260/45.75 W; 260/45.9 NP; 260/45.95 G
[58] Field of Search ....... 260/42.46, 45.7 R, 45.9 NP, 260/45.95 G, 29.1 SB

[56] References Cited

U.S. PATENT DOCUMENTS

| | | | |
|---|---|---|---|
| 3,163,492 | 12/1964 | Thomas | 260/23 H |
| 3,248,359 | 4/1966 | Maloney | 260/42.46 |
| 3,449,161 | 6/1969 | Hindersinn et al. | 260/45.9 NP |
| 3,562,197 | 2/1971 | Sears et al. | 260/45.9 NP |
| 3,810,862 | 5/1974 | Mathis et al. | 260/45.9 NP |
| 3,826,775 | 7/1974 | Sobolev et al. | 260/45.7 R |
| 3,832,326 | 8/1974 | North et al. | 260/42.15 |
| 3,860,542 | 1/1975 | Sakaguchi et al. | 260/42.46 |
| 3,877,974 | 4/1975 | Mischutin | 260/45.9 NP |
| 3,936,416 | 2/1976 | Brady | 260/45.9 NP |
| 4,006,114 | 2/1977 | Carlson | 260/42.46 |
| 4,075,163 | 2/1978 | Hofer et al. | 260/45.7 P |
| 4,147,741 | 4/1979 | Slama et al. | 260/45.7 RL |
| 4,193,911 | 3/1980 | Fochesato | 260/45.7 R |

*Primary Examiner*—Howard E. Schain
*Assistant Examiner*—R. A. White
*Attorney, Agent, or Firm*—Richard P. Crowley

[57] ABSTRACT

Noninflammable textile fibers and the process of producing such fibers, which fibers are composed of an olefinic polymer containing in combination: a hydrated alumina; a halogenated organic compound; and a fire-retardant compound selected from the group consisting of ammonium polyphosphate and zinc borate.

29 Claims, No Drawings

NONINFLAMMABLE OLEFIN FIBERS AND METHOD OF PRODUCING SAME

REFERENCE TO PRIOR APPLICATION

This application is a continuation-in-part of my copending U.S. patent application Ser. No. 864,459, filed Dec. 27, 1977 (now U.S. Pat. No. 4,193,911, issued Mar. 18, 1980), hereby incorporated by reference), which describes and claims noninflammable textile fibers containing a synergistic additive composition of a hydrated alumina, a halogenated organic polyphosphonate compound and a halogenated organic compound.

BACKGROUND OF THE INVENTION

A number of processes and additives have been prepared and used to make flame-retardant or noninflammable textile fibers and products produced therefrom. However, often such additives or treatments result in fibers which present toxicity problems on use or which form toxic materials, such as gases, when exposed to heat or open flames. In addition, some additives are quite expensive or are required in such high concentrations to be effective that their use affects the fiber properties and become expensive at such concentration levels. It is, therefore, most desirable to provide textile fibers, particularly fibers composed of olefinic resins and similar polymers, with noninflammable properties at low cost, with low concentrations of additives and without the disadvantages of prior-art materials.

SUMMARY OF THE INVENTION

My invention relates to noninflammable textile fibers and the process of producing such fibers and the synergistic additive composition used in such fibers and process.

In particular, my invention concerns noninflammable textile fibers composed of olefinic resins which contain in combination a noninflammable amount of a metal-oxide hydrate which, on heating, releases water vapor, such as alumina hydrate; an organic halogenated compound, such as a halogenated diphenyloxide or a halogenated cyclohexane, or combinations thereof; and a fire-retardant agent of ammonium polyphosphate or a metal borate like zinc borate, or combinations thereof. My textile fibers are noninflammable or nonburning in accordance with ASTM-D635-74 and, on exposure to flame, contract and melt, but do not burn or actively support a flame. The textile fibers of my invention further contract without combustion and without smoke or toxic combustion gases or products associated with other prior-art materials.

My invention provides a process by which textile fibers and textile-protecting products; that is, whether or not through blown or flat-film-fibrilated fibers, in particular with a polyolefin polymer, such as polyethylene with low specific weight (LDPE), polyethylene with high specific weight (HDPE) or a polymer or copolymer of polypropylene (PP), are made noninflammable.

My process also can be applied to nonwoven textiles of the extruded type; that is, usually called "spunbonded" fabric; that is, products of the very same synthetic resins as mentioned before. Such fibers can be produced by extrusion through a die spinneret or be split fibers prepared from blown or flat-film material. My noninflammable textile fibers may be employed usefully for use with woven and nonwoven sheet materials, such as carpet-backing materials, fabrics and other products employing fibers.

My invention provides for the production of noninflammable fibers of polyethylene and polypropylene fibers, with all advantages of fibers on a polyolefin basis; that is, low costs, low weight and good covering properties.

My textile fibers are composed of a thermoplastic polymer, particularly olefinic fibers and films, such as those composed of polyethylene, polypropylene, ethylene and propylene copolymers and terpolymers, polybutene and polypentene and pentene and butene copolymers, such as polymers of 4-methylpentene, and similar polymers, such as polyester fibers of ethylene, propylene, butene or pentene with terephthalate like polyethylene terephthalate.

The noninflammability additive composition useful in my invention comprises, as an essential ingredient, a hydrated metal-oxide material, such as an alumina hydrate, particularly the trihydrate of aluminum oxide, which, on exposure to heat, releases the hydrate molecules as water vapor. In the preferred embodiment, the hydrated alumina is coated or treated with a material, such as a lubricant, to enable the particulated hydrate material to be blended easily into the polymer or polymer-additive composition prior to fiber formation. The preferred lubricant-binder materials used for treatment of the hydrated alumina comprise organic silane compounds, such as vinyl tris (beta methoxy-ethoxy silane). The silane compounds provide for easy blending of the hydrated alumina and good binding of the alumina in the polymer, due to the compatible organic nature of the terminal vinyl group thereon. Other lubricants may be employed for treating the alumina, such as metallic stearates like sodium, potassium, calcium, magnesium and zinc stearates, fatty-acid amides, fatty-acid esters, waxes, chlorinated paraffin, solid silicone compounds and the like.

Another essential ingredient of my additive composition comprises a halogenated organic compound, and in particular: a polybromo or chloro or bromochloro diphenyl oxide, such as deca bromo diphenyl oxide; or a polybromo or chloro or bromochloro cyclohexane, such as a $C_2$–$C_{10}$ bromochloro cyclohexane like penta or deca bromochloro cyclohexane. The lower substituent cyclohexanes may be used where extrusion of fiber-forming temperature is lower, such as less than 210° C. to 220° C., while the higher substituent cyclohexanes are used where the fiber-extrusion temperature is higher. The diphenyl oxide and cyclohexane compounds may be used alone or in combination.

A third essential ingredient of my additive composition and noninflammable fibers comprises a fire-retardant agent, particularly ammonium polyphosphate or multivalent metal borate like zinc borate, or combinations thereof.

I have discovered that the combination of the essential ingredients produces synergistic and unexpected results and permits the manufacture of olefinic fibers which are noninflammable under ASTM-D635-74, without substantial diminution of the desirable useful properties of the fibers.

The essential additives may be used alone or with other additives, such as heat stabilizers, plasticizers, blowing agents, UV stabilizers, flame retardants, lubricants, property and viscosity modifiers, dyes and colorants, pigments, fillers, antistatic additives, antioxidants and the like.

My additive composition may be prepared employing a support resin, such as an ethylene vinyl acetate (EVA) resin; for example, with a melt index of 12/15, in order to permit easier dispersion of high concentrations of the additive than is possible directly into the olefinic fiber resin, such as the polypropylene or polyethylene. Thus the use of support resin, into which the additive composition may be dispersed more easily at higher concentrations than the ultimate olefinic fiber resin, is recommended. The support resin should be compatible with the olefinic resin and not increase the flammability thereof or otherwise diminish the desirable properties of the fiber. The support resin may comprise only 0.01% to 1% of the fiber or from 5% to 80%; for example, 30% to 65%, by weight of the additive masterbatch composition.

It is also desirable to incorporate, with the essential synergistic ingredients of my fibers, a small, but effective, amount; for example, 0.01% to 1% by weight, of a thermal stabilizer for the support resin where employed and the olefinic resin, such as a phosphorous-containing compound like a phosphonite compound.

The concentration of hydrated alumina in the fibers may vary; however, typical amounts in excess of about 15%, such as 12.5%, by weight of the fibers makes fiber extrusion difficult, while concentrations of less than about 0.5% by weight are not desired. The preferred range of the hydrated alumina in the fibers is about 2.0% to 8.0%; for example, 2.5% to 5.0%.

The amount of the halogenated organic compound and the fire-retardant agent may vary, but typically ranges from about 0.5% by weight of the fibers to about 8.0%; for example, 1.0% to 5.0% by weight. The amount of the essential ingredients may vary; however, sufficient amount of the ingredients and the additive composition should be used to make the fiber nonburning, without affecting the desirable mechanical strength of the fibers in the extrusion or fiber-forming process and any fiber-drawing process.

My invention will be described for the purpose of illustration only in regards to the preparation of certain noninflammable fibers containing preferred additive combinations. However, various changes and modifications may be made in the formulations set forth herein, without departing from the spirit and scope of my invention.

DESCRIPTION OF THE EMBODIMENTS

My process permits the preparation of polypropylene or polyethylene fibers in staple and in tow form from 2.5 denier to 18 and up denier, with round or trilobal/multilobal cross section. The flame-retardancy characteristics are based upon a synergistic action developed by the coaction of the three essential ingredients. In order to obtain the best flame-retardant properties, the fibers should contain from 3% to 6% of the additive composition.

The additive formulation may be incorporated into the fibers in a variety of systems. One system is the most simple and consists of placing the three chemical products of the formulation (in the indicated percentages) into a rotating mixer, with a maximum of 0.3% of butyl stearate as a dispersant agent, and mixing for a few minutes the polypropylene granules with the formulation; for example, 3% of the formulation with 97% of normal PP granules, and, thereafter, placing the blend in the extruder and spinning the fibers. The mass coloration of the fibers can be made by mixing into the granules the dyestuffs in pellet form.

The second system comprises placing the three chemical products of the formulation (in the indicated percentages) in a mixer with normal PP resin in the flax form and blending in a Bambury mixer for a few minutes, placing the blend in a precompounding-unit extrusion line with a feeder screw, and extruding in the form of a ribbon (flat or round) and cutting into chips with a rotary knife cutter. The mass coloration and also the UV stabilization of the fibers can be made by mixing the dyestuffs and the UV additives during the preextrusion stage. It is possible with this system to obtain colored FR chips ready for fiber extrusion.

The third system consists of the production of flame-retardant masterbatches charged with about 30% to 60% of an active flame-retardant formulation dispersed in polypropylene resin or polyethylene resin in flax form. If there is some difficulty in attaining a high concentration in the olefinic resin, it is possible to disperse the formulation in a support resin.

The production of the masterbatches is very similar to produce chips with a precompounding unit. A master containing 30% of FR compound is prepared by dispersing into PP or PE resin in flax form 10 parts of silane-ATH, 10 parts of penta bromochloro cyclohexane and 10 parts of ammonium polyphosphate, with 70 parts of normal PP or PE resin. The charged chips are mixed with normal PP granules in a turbomixer with dyestuffs in pellet form and eventually with the UV stabilizers.

For example, to obtain a fiber with about 4% of FR compound content, the following mixture is used:
- 85 parts of normal PP chips; and
- 15 parts of chips charged with 30% additive formulation. This system provides good control of blended products and permits easy adjusting of the quantity of the additive formulation contained in the fibers.

POLYPROPYLENE-FIBER FLAME RETARDANTS

Sample 1

| This sample contains: | |
|---|---|
| Trihydrated alumina (ATH) Rhone-Poulenc Type SH-100 | 1% |
| Penta bromochloro cyclohexane - Dow Chemical FR 651A | 1% |
| Ammonium polyphosphate - Monsanto Chemical Phoscheck P30 | 1% |
| | 3% |

The flame-retardant products are masterized in pellet-form masters containing 10% ATH, 10% penta bromochloro cyclohexane and 10% ammonium polyphosphate (in all 30% of active FR products) dispersed in polyethylene resin of melt index 20, so that the masterbatches employed in this sample are formed by 70 parts of LD-PE and 30 parts of FR compound. This master has been mixed at 10% with polypropylene resins of melt index 11, so that the fibers are formed by 10 parts of FR master and 90 parts of normal PP in pellet form.

Characteristics of Sample 1

| Nominal staple denier | 10 dpf |
|---|---|
| Maximum title deviation | ±5% |

| | |
|---|---|
| -continued | |
| Percentage of dyestuffs | 2.4% |

Extrusion Temperatures

Z.1 = 185° C.  
Z.2 = 190° C.  
Z.3 = 195° C.  
Z.4 = 200° C.  
} Feeder Screw Temperatures Extrusion was accomplished at less than 220° C. to prevent some oxidation of the polymer.

The additive formulation did not have effect in drawing, crimping and heat-setting of the fibers, and also the fiber tenacity was very good. The fibers were not delustered by the additives, and no change occurred in the color fastness and UV resistance.

Sample 1—Flame-Retardant Tests

| Gas Flame at 700/750° C. | | |
|---|---|---|
| 45° Flame: | 5 seconds ignition: | Nonburning |
| | 10 seconds ignition: | Nonburning |
| | 15 seconds ignition: | Nonburning |
| | 30 seconds ignition: | Nonburning |
| Vertical Flame: | 5 seconds ignition: | Nonburning |
| | 10 seconds ignition: | S.E. few seconds |
| | 15 seconds ignition: | S.E. few seconds |
| | 20 seconds ignition: | S.E. few seconds |
| | 30 seconds ignition: | S.E. few seconds |

Sample 2

This sample contains:
26 parts of ATH silane coated
  (Solem Type 632SP)
26 parts of deca bromo diphenyl oxide
  (Dow Chemical FR 300BA)
26 parts of zinc borate
  (U.S. Borax Firebrake ZB)
2 parts of a thermal stabilizer
  (Sandoz Sandostab PEPQ)
20 parts of support resin (EVA)

Sample 3

This sample contains:
26 parts of ATH silane coated
  (Solem Type 632SP)
32 parts of deca bromo diphenyl oxide
  (Dow Chemical FR 300BA)
20 parts of ammonium polyphosphate
  (Monsanto Type Phoscheck P-30)
2 parts of a thermal stabilizer
  (Sandoz Sandostab PEPQ)
20 parts of support resin (EVA)

Sample 4

The individual ingredients of the samples were tested for flammability rating under ASTM-D635-74 in a polypropylene homopolymer, with the following results:

| Ingredients | Amount by Weight | Flammability Rating |
|---|---|---|
| 1. Alumina trihydrated silane coated (Solem Type 631SA) | 1% | FB |
| 2. Alumina trihydrated silane coated (Solem Type 631SA) and penta chlorobromo cyclohexane | 1% each | FB |
| 3. Penta chlorobromo cyclohexane | 1% | FB |
| 4. Deca chlorobromo cyclohexane | 1% | FB |
| 5. Ammonium polyphosphate | | |
| 6. Zinc borate | | |
| 7. Deca bromo diphenyl oxide | | |
| 8. Additive composition of #1 0.8% #3 1.2% D #5 1.0% | | |
| 9. Additive composition of #1 1.0% #4 1.2% D #5 0.8% | | |
| 10. Sample 2 D | | |
| 11. Sample 3 D | | |

Legend:
FB = free-burning
D = difficult to ignite
B = ignites

Sample 5

The use of the additive formulation of Samples 1 and 2 in polyethylene fibers also provided for noninflammable fibers.

All of the above-mentioned formulas are based on a working of positive synergism; that is, developed by the various additives of which the formulas are composed. Fibers composed of the formulas are noninflammable when tested under ASTM-D635-74. The additives used alone do not provide the same results and are not noninflammable fibers when used separately in the same concentration.

The trihydrate of aluminum oxide contains about 35% of chemical-composed water that requires a caloric power, in order to release itself from the aluminum trioxide. The effect of the dehydration, plus the rarefaction of the inflammable vapors by water vapor, takes place at temperatures which coincide with the isothermic working of the compounds which are exposed to the heat. Consequently the effect is the cooling down of the polymer that puts a limit to the pyrolysis of the inflammable vapors. The only vapor that releases itself is water vapor, whereas, at the same time, the halogen compounds in the polymer are working as a fire trap and the trihydrate of aluminum oxide as a smoke reducer. The small quantity of halogens in the formulas does not cause a supply of poisonous gas, seeing that these high-molecular-weight halogenated compounds are extraordinarily stable as well.

My method to make textile fibers and textile-protecting fibers, on a polyolefin basis, noninflammable represents a distinct advantage in the production of noninflammable textile fibers, seeing that, in a very inexpensive way, these fibers can replace other noninflammable fibers which are already on the market for a long time, such as the modacryl (modified acryl) and vinyl-chloride fibers which, although not inflammable, melt and crimp when exposed to heat, during which process a great deal of corrosive and poisonous smoke is set free, seeing that these fibers have a high chlorine content. As a rule, the modacrylic fibers, depending on the type in question, contain between 40% and 60% of vinyl or vinylidene chloride, whereas the vinyl-chloride matters consist of 100% vinyl chloride, with a chlorine content varying from 55% to 64% according to its type.

It is evident that the samples given are not to be considered as a limitation for the percentages given for the formulas in question; however, only as samples without any restriction, seeing that other percentages can be used as well, in which case the essential properties of the formulas remain unchanged without exceeding the limits of the invention.

What I claim is:

1. Noninflammable olefinic-resin fibers, which fibers contain in combination as fire-retardant agents:
    (a) from about 0.5% to 15% by weight of a hydrated alumina, which alumina has been treated to permit the alumina to be incorporated into the olefinic-resin composition from which the fibers are produced;
    (b) from about 0.5% to 8.0% by weight of a halogenated organic compound selected from the group consisting of
        (i) a polyhalo cyclohexane, and
        (ii) a polyhalo diphenyl oxide;
    (c) from about 0.5% to 8.0% by weight of ammonium polyphosphate; and
    (d) the olefinic fibers being noninflammable when tested by ASTM-D635-74.

2. The fibers of claim 1 wherein the hydrated alumina has been treated with an organic vinyl tris beta methoxyethoxy silane material having terminal vinyl groups.

3. The fibers of claim 1 wherein the halogenated compound is penta to deca bromo diphenyl oxide.

4. The fibers of claim 1 wherein the halogenated compound is a penta to deca bromochloro cyclohexane.

5. The fibers of claim 1 wherein the fibers contain a small amount of an ethylene-vinyl-acetate resin as a support resin for the flame-retardant agent.

6. The fibers of claim 1 wherein the olefinic resin is selected from the group consisting of a polypropylene and a polyethylene resin.

7. The fibers of claim 1 wherein the fire-retardant agents comprise in combination from about 3% to 6% by weight of the fibers.

8. The fibers of claim 1 wherein the hydrated alumina comprises from about 2.0% to 8.0% by weight, the halogenated compound comprises from about 1.0% to 5.0% by weight, and the ammonium polyphosphate comprises from about 1.0% to 5.0% by weight.

9. The fibers of claim 1 wherein the hydrated alumina comprises an organic silane-treated hydrated alumina.

10. The fibers of claim 1 wherein the halogenated organic compound is selected from the group of chloro and bromo compounds or combinations thereof.

11. Noninflammable olefinic-resin fibers, which fibers contain in combination as fire-retardant agents:
    (a) from about 0.5% to 15% by weight of a hydrated alumina, which alumina has been treated to permit the alumina to be incorporated into the olefinic-resin composition from which the fibers are produced;
    (b) from about 0.5% to 8.0% by weight of a polybromo diphenyl oxide;
    (c) from about 0.5% to 8.0% by weight of ammonium polyphosphate; and
    (d) the olefinic fibers being noninflammable when tested by ASTM-D365-74.

12. The fibers of claim 1 wherein the hydrated alumina is present in an amount of from about 2.0% to 8.0% by weight.

13. The fibers of claim 1 wherein the hydrated alumina has been treated with an organic silane material having terminal vinyl groups.

14. The fibers of claim 13 wherein the silane material is vinyl tris beta methoxy-ethoxy silane.

15. The fibers of claim 1 wherein the halogenated compound is present in an amount of from about 1.0% to 5.0% by weight.

16. The fibers of claim 1 wherein the halogenated compound is penta to deca bromo diphenyl oxide.

17. The fibers of claim 1 wherein the ammonium polyphosphate is present in an amount of from about 1.0% to 5.0% by weight.

18. The fibers of claim 1 wherein the fibers contain from 0.01% to 1% by weight of the fibers of an ethylene-vinyl-acetate resin as a support resin for the flame-retardant agent.

19. The fibers of claim 1 wherein the fibers include from about 0.01% to 1.0% by weight of a thermal stabilizer phosphonite compound for the olefinic resin.

20. The fibers of claim 1 wherein the olefinic resin is selected from the group consisting of a polypropylene and a polyethylene resin.

21. The fibers of claim 1 wherein the fire-retardant agents comprise in combination from about 3% to 6% by weight of the fibers.

22. Noninflammable, polypropylene and polyethylene olefinic-resin fibers, which fibers contain in combination as fire-retardant agents:
    (a) from about 0.5% to 15% by weight of a hydrated alumina, which alumina has been treated with an organic silane material having terminal vinyl groups, to permit the alumina to be incorporated into the olefinic-resin composition from which the fibers are produced;
    (b) from about 0.5% to 8.0% by weight of a polybromo diphenyl oxide;
    (c) from about 0.5% to 8.0% by weight of ammonium polyphosphate; and
    (d) the olefinic fibers being noninflammable when tested by ASTM-D635-74.

23. The fibers of claim 22 wherein the fibers include from about 0.01% to 1.0% by weight of a thermal stabilizer phosphonite compound for the olefinic resin.

24. A process for the production of noninflammable, thermoplastic, olefinic textile fibers, which process comprises:
    (a) admixing into an olefinic-polymer composition, adapted to prepare textile fibers, an additive composition, which additive composition comprises in combination as active ingredients
        (i) from about 0.5% to 15% by weight of a hydrated alumina, which alumina has been treated to permit the alumina to be incorporated into the olefinic-resin composition from which the fibers are produced,
        (ii) from about 0.5% to 8.0% by weight of a polybromo diphenyl oxide, and
        (iii) from about 0.5% to 8.0% by weight of ammonium polyphosphate; and
    (b) forming the thermoplastic polymer composition containing the additive composition into a noninflammable textile fiber which is noninflammable when tested by ASTM-D635-74.

25. The process of claim 24 wherein the olefinic resin is selected from the group consisting of polyethylene and polypropylene.

26. The process of claim 22 wherein the additive composition includes a small, but effective, amount of a thermal stabilizer phosphonite compound for the olefinic resin.

27. The process of claim 24 wherein the additive master-batch composition contains from about 5% to 80% by weight of an ethylene-vinyl-acetate support resin in which the additives are dispersed.

28. The process of claim 24 which includes extruding the olefinic-resin composition into fibers at a temperature of about 220° C. or less.

29. The process of claim 24 wherein the fire-retardant agents comprise in combination from about 3% to 6% by weight of the fibers.

* * * * *

UNITED STATES PATENT OFFICE
CERTIFICATE OF CORRECTION

PATENT NO. : 4,298,509
DATED : November 3, 1981
INVENTOR(S) : Antonio Fochesato

It is certified that error appears in the above-identified patent and that said Letters Patent are hereby corrected as shown below:

Column 8, claim 12, line 1, delete "1" and insert therefor --11--.
Column 8, claim 13, line 4, delete "1" and insert therefor --11--.
Column 8, claim 15, line 9, delete "1" and insert therefor --11--.
Column 8, claim 16, line 12, delete "1" and insert therefor --11--.
Column 8, claim 17, line 14, delete "1" and insert therefor --11--.
Column 8, claim 18, line 17, delete "1" and insert therefor --11--.
Column 8, claim 19, line 21, delete "1" and insert therefor --11--.
Column 8, claim 20, line 24, delete "1" and insert therefor --11--.
Column 8, claim 21, line 27, delete "1" and insert therefor --11--.

Signed and Sealed this

Ninth Day of February 1982

[SEAL]

Attest:

GERALD J. MOSSINGHOFF

Attesting Officer   Commissioner of Patents and Trademarks